United States Patent [19]

Roper et al.

[11] 4,130,519

[45] Dec. 19, 1978

[54] STABILIZED HALOGENATED BUTYL RUBBER

[75] Inventors: Robert Roper, Summit; Neil F. Newman, Edison, both of N.J.; Pierre Hous, Steenokkerzeel, Belgium

[73] Assignee: Exxon Research & Engineering Co., Florham Park, N.J.

[21] Appl. No.: 892,645

[22] Filed: Apr. 3, 1978

[51] Int. Cl.² .............................................. C08K 5/10
[52] U.S. Cl. .................... 260/23.7 H; 260/31.4 R; 260/33.2 R; 260/42.35; 260/45.7 R
[58] Field of Search ............ 260/45.7 R, 23.7 H, 260/33.2 R, 31.4 R, 42.35, 23 XA

[56] References Cited

U.S. PATENT DOCUMENTS

| | | | |
|---|---|---|---|
| 2,075,251 | 3/1937 | Winkelmann | 260/45.7 R |
| 2,364,410 | 12/1944 | Whittaker | 260/45.7 R |
| 2,833,734 | 5/1958 | Morrissey et al. | 260/23.7 H |
| 2,958,667 | 11/1960 | Eby et al. | 260/23.7 H |
| 2,962,473 | 11/1960 | Baldwin et al. | 260/23.7 H |
| 3,558,537 | 1/1971 | Hecker et al. | 260/23 XA |
| 3,717,600 | 2/1973 | Dalhuisen et al. | 260/23.7 H |
| 4,029,619 | 6/1977 | Tajima et al. | 260/23 XA |

OTHER PUBLICATIONS

Journal of Polymer Science – Polymer Chemistry Edition, vol. 12, 2305–2315 (1974), Dodson et al.

*Primary Examiner*—V. P. Hoke
*Attorney, Agent, or Firm*—Harvey L. Cohen

[57] ABSTRACT

A stabilized halogenated butyl rubber composition comprises halogenated butyl rubber, an alkali metal or alkaline earth metal carboxylate, an ether and an oxide or hydroxide of a Group IIA metal as exemplified by halogenated butyl rubber containing both bromine and chlorine stabilized with a composition comprising calcium stearate, polyethoxylated adducts of sorbitol esterified with from 1 to 6 moles of oleic acid and mixtures thereof, and calcium hydroxide.

Halogenated butyl rubbers stabilized in the manner disclosed exhibit improved resistance to discoloration upon high temperature exposure, such as during the drying of polymers in the course of manufacture.

21 Claims, No Drawings

STABILIZED HALOGENATED BUTYL RUBBER

BACKGROUND OF THE INVENTION

1. Field of the Invention

This invention relates to the stabilization of halogenated butyl rubber and the stabilized compositions resulting therefrom. More particularly, this invention is concerned with stabilization against discoloration at high temperatures of halogenated butyl rubber such as bromochlorinated butyl. Most particularly, this invention relates to said stabilized polymer compositions comprising a halogenated butyl and an effective amount of stabilizer, said stabilizer consisting essentially of an alkali metal or alkaline earth metal carboxylate, an ether and an oxide or hydroxide of a metal selected from Group IIA of the Periodic Table.

Stabilizers are employed in the production of halogenated butyl rubber for such purposes as protecting these polymers from the effects of both high temperatures during manufacture and from long term, moderate temperatures during storage prior to use. Multicomponent systems have been developed to accomplish this task, but deficiencies in such systems have been observed in both actual protection achieved and side effects such as discoloration which can occur with some of the prior art compositions. An object of the present invention is to provide a polymer composition with improved stability.

2. Prior Art

Stabilizers and stabilized polymer compositions in the area of halogenated polymers form a substantial body of prior art. So far as applicants are aware, prior art relevant to stabilization of butyl rubbers is represented by the following disclosures.

U.S. Pat. No. 2,962,473 issued Nov. 29, 1960 to F. P. Baldwin et al is entitled "Process for Stabilizing Halogenated Butyl Rubber Against Gelation With Magnesium Oxide, and Stabilized Product Obtained Thereby." This reference teaches that magnesium oxide can be employed in halogenated butyl rubber, for example, chlorinated isobutylene-isoprene rubber as a stabilizer against gelatin and dehydrohalogenation (col. 1, line 50). The reference fails to teach or suggest the use of other Group IIA metal oxides or hydroxides or the addition of the two additional critical components of the instant invention, the ether and the carboxylate, as will be described in detail in later paragraphs. Furthermore, no information is provided in the reference with regard to stabilization against discoloration of the halogenated butyl rubber compositions containing magnesium oxide. Baldwin et al also describe the use of the stabilized compositions in conventional rubber compositions containing additional fillers and extenders (col. 3, lines 38 ff.), including CaO (line 61), but it was clearly not employed as a critical part of a stabilizer package. The use of adsorbent deactivators such as various high boiling polar compounds (ethylene glycol) is described by Baldwin et al (col. 4, line 7), but the class of materials described and claimed in the instant invention and their critical necessity to the success of the stabilizer composition disclosed herein was not recognized or suggested in the reference. In their preparation of a chlorinated butyl rubber sample Baldwin et al employed "an aliphatic polyoxyethylene ether type wetting agent (i.e. Sterox A.I.)" (col. 5, line 17) in order to obtain an aqueous slurry of the rubber. In the reference this compound was specifically employed as a wetting agent and obviously any other wetting agent would have been satisfactory so long as it maintained the rubber as a slurry. The reference does not teach, suggest or imply that such materials should be retained in the finished rubber or that they might be beneficial for stabilization purposes.

The presence in chlorinated butyl of zinc stearate and the same wetting agent noted above is disclosed in U.S. Pat. No. 2,964,489, "Process of Chlorinating Butyl Rubber and Vulcanizing The Chlorinated Product," issued Dec. 13, 1960, to F. P. Baldwin et al, (column 6, line 56 and column 8, line 67). The reference clearly recites that zinc stearate functions as an "anti-tack agent" (col. 8, line 75) and the aliphatic polyoxyethylene ether functions as a dispersing aid (col. 7, line 61) in precisely the same manner as discussed above. The use of zinc stearate is scrupulously avoided in the instant invention as zinc is an undesirable metal in the presence of halogenated butyl unless one is intentionally attempting to crosslink such polymers. The discussion above relative to the dispersing aid is applicable here too. In addition, the stabilized composition disclosed in the instant invention is not suggested in any form by this reference, the presence of the dispersing agent and the zinc stearate being used merely to facilitate preparation of a stable, processable rubber slurry.

Stabilizers representing only a part of the instant disclosure are described in West German patent Application No. 2,551,040 of K. Tanioka et al published on May 26, 1977. The reference describes stabilizers for polyvinylchloride and other chlorine-containing resins which comprise calcium hydroxide coated with an organic calcium salt, preferably calcium stearate. The method employed to prepare these stabilizers includes the use of a surfactant. Tanioka et al list nonionic, anionic and cationic surfactants as acceptable materials for their process and clearly employ these materials at such levels, and in such a manner so as to function strictly as surfactants, not as critical components of the stabilizer composition. This is emphasized by two factors;

(1) certain ionic surfactants, being water soluble will remain in the water phase during preparation of the coated stabilizer, and (2) the coated stabilizer will be essentially free of nonionic surfactants in the event an alcohol wash step is used in the process to remove unreacted stearic acid as is shown in Example 1 of the reference. The nonionic surfactants employed are soluble in alcohol and no direction is given to avoid their extraction during preparation of the stabilizer. Therefore, it is obvious that Tanioka et al do not teach, suggest or imply the inclusion of an ether, whereas such a component is specifically disclosed as a critical component in the present invention.

P. Hous, in Belgian Pat. No. 849,943 (1977) and U.S. application Ser. No. 752,886, filed Dec. 21, 1976 now U.S. Pat. No. 4,104,218 issued Aug. 1, 1978 one of the inventors herein has disclosed a stabilizer halobutyl rubber composition comprising a stabilizer consisting essentially of an alkali metal or alkaline earth metal carboxylate, e.g. calcium stearate and an ether, e.g. a polyether. However, this reference fails to teach the advantage disclosed herein of employing a Group IIA metal oxide or hydroxide in combination with the two components noted above. In this connection, attention is invited to Examples 1-4 of the present application.

SUMMARY OF THE INVENTION

In accordance with the present invention it has been discovered that stabilized halogenated butyl rubber compositions are obtained when such halogenated butyl rubber compositions comprise a copolymer of 85 to 99.5 weight percent of a $C_4$ to $C_8$ isoolefin with 15 to 0.5 weight percent of a $C_4$ to $C_{14}$ multiolefin containing at least about 0.5 weight percent combined halogen in its structure and an effective amount of stabilizer, said stabilizer comprising (a) an alkali metal carboxylate or an alkaline earth metal carboxylate, (b) an ether, and (c) an oxide or hydroxide of a metal selected from Group IIA of the Periodic Table.

The improved heat stability of such compositions is particularly evident when characterized by polymer discoloration response. Another benefit of the stabilized compositions is the reduced level of carboxylic acid, such as stearic acid measured after heat exposure. Halogenated butyl rubber benefiting from the above stabilizer compositions include not only chlorinated and brominated polymers, but also bromochlorinated butyl rubbers containing both bromine and chlorine in their structure.

DESCRIPTION OF PREFERRED EMBODIMENTS

(A) Polymers

The expression "butyl rubber" is used in the rubber industry to describe copolymers made from a polymerization reaction mixture having therein from 70 to 99.5% by weight of an isoolefin which has about 4 to 8 carbon atoms, e.g., isobutylene, and about 30 to 0.5% by weight of a conjugated multiolefin having from about 4 to 14 carbon atoms, e.g., isoprene. The resulting copolymers contain 85 to 99.5% by weight of combined isoolefin and about 0.5 to 15% by weight of combined multiolefin. The preparation of butyl rubber is described in U.S. Pat. No. 2,356,128, which is incorporated herein by reference. The polymer backbone of commercial butyl rubber consists primarily of isobutylene units, with a few percent of isoprene units.

Conventional high molecular weight butyl rubber generally has a number average molecular weight of about 25,000 to about 500,000, preferably about 80,000 to about 300,000, especially about 100,000 to about 250,000; and a Wijs Iodine No. of about 0.5 to 50, preferably 1 to 20. More recently low molecular weight polymers have also been prepared which have number average molecular weights of from 5,000 to 25,000 and unsaturation expressed as mole %, of 2–10.

Some forms of halogenated butyl rubber are commercially available, such as chlorinated butyl rubber and brominated butyl rubber. One method used to prepare halogenated butyl rubber is that of halogenating butyl rubber in a solution (butyl rubber cement) containing between 1 to 60% by weight of butyl rubber in a substantially inert $C_5$–$C_8$ hydrocarbon solvent such as pentane, hexane, heptane, etc. and contacting this butyl rubber cement with a halogen for a period of up to about 25 minutes. There is then formed the halogenated butyl rubber and a hydrogen halide, the polymer containing up to one or somewhat more halogen atoms per double bond initially present in the polymer. Generally, halogenated butyl rubber comprises a copolymer of 85 to 99.5 weight percent of a $C_4$ to $C_8$ isoolefin with 15 to 0.5 weight percent of a $C_4$ to $C_{14}$ multiolefin containing at least about 0.5 weight percent combined halogen in its structure. For example, where butyl is halogenated with bromine, the bromine can be present in the brominated butyl in an amount of from about 1.0 to about 3.0 weight percent, preferably from about 1.5 to about 2.5 weight percent. A method of preparing halogenated butyl rubber is described in U.S. Pat. No. 3,099,644, which is incorporated herein by reference.

In addition to halogenated butyl rubber wherein a single halogen is incorporated into the polymer structure, e.g. chlorine or bromine, another type of halogenated butyl rubber particularly suitable for the practice of this invention is one in which more than one halogen is incorporated into the polymer, e.g. bromine and chlorine, bromochlorinated butyl. One method for preparing such a product is to halogenate a solution of butyl rubber (butyl cement) using bromine chloride as the halogenating agent, said solution containing between 1 to 60% by weight of butyl rubber in a substantially inert $C_5$–$C_8$ hydrocarbon solvent such as pentane, hexane, heptane, etc. The bromine chloride may be introduced into the butyl cement as a liquid, or, in a preferred method, by first vaporizing said bromine chloride before contacting said cement and halogenating the butyl rubber in a period of from about 1–30 minutes. Recovery of the bromochlorinated product from solution is substantially similar to the recovery of bromobutyl or chlorobutyl well known in the art. The product prepared by reaction of bromine chloride with butyl rubber is characterized in that the bromine and chlorine are distributed in a specific manner in the halogenated polymer: from about 1.0 to about 3.0 weight % bromine and from about 0.05 to about 0.5 weight % of chlorine. The mole ratio of bromine:chlorine of about 4:1 is markedly deviant from the 1:1 ratio expected for an addition reaction and the utilization of approximately 50 mole % of the BrCl, in combination with a strongly acidic reaction medium is consistent with a primarily substitutive reaction. Other methods of incorporating more than one halogen in butyl rubber are available, e.g., brominating a polymer which has been previously chlorinated or chlorinating a polymer which has been previously brominated, halogenating with a mixture of bromine and chlorine, etc. (see e.g., U.S. Pat. No, 3,009,904 to C. E. Serniuk et al, incorporated herein by reference). The present invention is not intended to be limited in any way by the manner in which butyl rubber is halogenated, and chlorinated, brominated and bromochlorinated butyl rubber are suitable for use in preparing the compositions of this invention.

B. Stabilizer System (1) Carboxylate

The metal portion of the metal carboxylate can be an alkali or alkaline earth metal. Thus, particularly suitable carboxylates are those of sodium, magnesium, and calcium. The carboxylic acid from which the carboxylate is derived can be mono- or poly-carboxylic. Thus, suitable mono-carboxylic acids are the $C_4$ to $C_{20}$ mono-carboxylic acids such as caproic, caprylic, pelargonic, myristic, palmitic, oleic, stearic and 2-ethyl hexanoic acids. Also suitable is naphthenic acid. The preferred metal carboxylate is calcium stearate.

(2) Ethers

The ether component of the stabilized composition may be an aliphatic or aromatic monofunctional ether including diallyl, diaryl and alkylaryl ethers containing a total of at least about 10 up to about 40 carbon atoms such as dipentyl ether, dihexyl ether, dioctylether, didecyl ether, didodecyl ether, dihexadecyl ether, dioctadecyl ether, diphenyl ether, dibenzyl ether, phenyl butyl ether and the like. While such monofunctional ethers are suitable for use in the present invention it is preferable to employ a polyether as described hereinbelow.

Suitable polyethers for use in the invention include polyhydric alcohols, for example, diethylene glycol, triethylene glycol and polyethylene glycols, said polyethylene glycols preferably having a molecule weight of from 100 to 5000, e.g. 200–1000. Also suitable are the polypropylene glycols, e.g., dipropylene glycol and tripropylene glycol. Other suitable polyethers are polyalkylene glycols terminated by a group or groups other than hydroxyl, e.g. by an alkyl group, and polyalkylene monohydric alcohols such as polyoxyethylene ether of tridecanol having about 9 to 10 ethylene oxide units.

Suitable polyethers also include the class of materials which are adducts of ethylene oxide or propylene oxide to a polyhydric alcohol such as glycerine, pentaerythritol, sorbitol and the like or $C_8$ to $C_{24}$ fatty acid esters of such alcohol adducts such as oleic acid esters. Particularly suitable polyethers include polyoxyethylene adducts of sorbitol esterified with 1–6 moles of oleic acid and mixtures thereof each containing 4–100 ethylene oxide units per mole of sorbitol ester and mixtures thereof. Intended for the purposes of this invention are such compounds as polyoxyethylene sorbitol monooleate, polyoxyethylene sorbitol dioleate, polyoxyethylene sorbitol trioleate, polyoxyethylene sorbitol tetraoleate, polyoxyethylene sorbitol pentaoleate, polyoxyethylene sorbitol hexaoleate and mixtures thereof, each containing 4–100 ethylene oxide units per mole of sorbitol ester, as well as the commercially available products polyoxyethylene sorbitol oleate sold under the trademarks Atlox 1087 and G-1087, and polyoxyethylene (40) sorbitol septaoleate having 40 ethylene oxide units per mole of sorbitol septaoleate sold under the trademark Arlatone T. The preferred specific polyether of the aforementioned class is the last named product, polyoxyethylene (40) sorbitol septaoleate sold under the trademark Arlatone T. For the purposes of this disclosure all such products can be referred to as polyoxyethylene sorbitol oleates represented by the chemical formula:

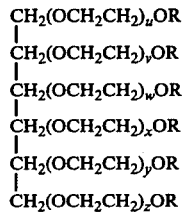

wherein R is H or $CH_3(CH_2)_7CH = CH(CH_2)_7CO$ and the sum of u, v, w, x, y and z is from about 4 to about 100.

Other suitable polyethers are the polyoxyethylene sorbitan fatty acid esters, wherein the fatty acids are defined as those of $C_8$ to $C_{24}$ in size. Particularly suitable polyethers of this class include polyoxyethylene sorbitan monostearate having from about 4 to about 40 ethylene oxide units per mole of sorbitan monostearate, polyoxyethylene sorbitan tristearate having from about 4 to about 40 ethylene oxide units per mole of sorbitan tristearate and polyoxyethylene sorbitan monooleate having from about 4 to about 40 ethylene oxide units per mole of sorbitan monooleate. The preferred specific polyethers of this class include polyoxyethylene (4) sorbitan monostearate having 4 ethylene oxide units per mole of sorbitan monostearate, polyoxyethylene (20) sorbitan tristearate having 20 ethylene oxide units per mole of sorbitan tristearate, and polyoxyethylene (5) sorbitan monooleate having 5 ethylene oxide units per mole of sorbitan monooleate, (sold under the trademarks Tween 61, Tween 65, and Tween 81, respectively).

Still other suitable polyethers are the polyoxyethylene esters of fatty acids wherein the fatty acids are again defined as above to include those of $C_8$ to $C_{24}$ in size. Particularly suitable polyethers of this class include polyoxyethylene stearate, palmitate and laurate each having from about 4 to about 100 ethylene oxide units per mole of stearate, palmitate or laurate. The preferred specific polyethers of this class include polyoxyethylene (40) stearate and polyoxyethylene (50) stearate, having respectively 40 and 50 ethylene oxide units per mole of stearate (sold under the trademark Myrj 52 and Myrj 53, respectively).

Still other suitable polyethers are the products formed by epoxidizing esters and glycerides of unsaturated fatty acids of about $C_8$ to $C_{24}$, such esters as soybean oil, castor oil, linseed oil, safflower oil, etc. The preferred specific polyethers of this class include epoxidized soybean oil and epoxidized linseed oil (sold under the trademarks Drapex 6.8 and Drapex 10.4, respectively).

The specifically preferred ether components, especially for use with bromochlorinated butyl are the polyoxyethylene adducts of sorbitol esterified with from 1 to 6 moles of oleic acid and mixtures thereof each containing from about 4 to about 100 ethylene oxide units per mole of sorbitol ester and mixtures thereof, especially the trademarked products Arlatone T, G-1087 and Atlox 1087.

(3) Metal Oxide or Hydroxide

The metal oxides or hydroxides suitable for use in this invention include those wherein the metal is selected from Group IIA of the Periodic Table. Particularly suitable are $Ca(OH)_2$, CaO, $Mg(OH)_2$ and MgO.

(4) Process

For the halogenated butyl to achieve improved stability by the practice of this invention, the three critical components of the stabilizer described above, the carboxylate, ether and metal oxide or hydroxide must be present in the rubber in an effective amount. In this invention an effective amount is taken to mean that said carboxylate should be present in an amount of from about 0.1 to about 10.0 weight percent, preferably 0.5 to about 5.0 weight percent; said ether should be present in an amount of from about 0.005 to about 5.0 weight percent, preferably 0.01 to about 3.0 weight percent; and said metal oxide or hydroxide should be present in an amount of from about 0.005 to about 5.0 weight percent, preferably 0.01 to about 3.0 weight percent, all weight percentages based on the weight of halogenated butyl.

In addition to the above-described stabilized composition of this invention other materials and also other stabilizing materials could also be incorporated into the halogenated butyl, e.g., antioxidants well known in the art such as 2,6-di-t-butyl-paracresol (butylated hydroxytoluene), phenyl beta-naphthylamine, etc. in effective amounts of from about 0.01 to about 1.0 weight percent, e.g. 0.05 to about 0.50 weight percent based on the weight of the halogenated butyl.

The stabilizer comprising the carboxylate, the ether, the metal oxide or hydroxide and, if desired, additional antioxidant can be incorporated in the halogenated butyl rubber by any means suitable for obtaining a reasonably uniform dispersion of said ingredients in said rubber. This step would preferably be conducted prior to exposure of the halogenated butyl to high temperatures wherein thermal stability of the polymer would be of concern.

This dispersion, mixing or blending can be accomplished in several ways. The above-named ingredients can be incorporated by adding them as a suspension in an aqueous or a hydrocarbon solvent to the halogenated butyl cement stream either before or during precipitation of said cement and/or injection of said cement into a hot aqueous medium (for example, steam stripping), and/or spray drying and/or drum drying of said cement. Alternatively, they could be added in undiluted form to the rubber just prior to or after entry of the rubber into the drying extruders.

The improved heat stability of the halobutyl rubber composition is particularly demonstrated by reduced discoloration after exposure to high temperature and also by the reduced level of carboxylic acid measured in the polymer after such exposure. This may be explained, specifically with reference to the following paragraph, which discusses a preferred embodiment wherein calcium stearate is the metal carboxylate component of the stabilizer and the halobutyl is chlorinated butyl rubber. Stabilized halobutyl compositions of the prior art, such as chlorinated butyl containing only calcium stearate, characteristically show the presence of stearic acid after being exposed to high temperatures. The presence of stearic acid indicates the consumption of the calcium stearate stabilizer as a result of dehydrochlorination; less calcium stearate being available for further stabilization of the rubber. Stearic acid is also inherently undesirable under such circumstances because it can accelerate further dehydrochlorination of the rubber. The lowered concentration of stearic acid measured in the stabilized compositions of the present invention reported in the examples necessarily indicates improved stability. Furthermore, stearic acid which is formed tends to be removed by conversion of the metal oxide or hydroxide to metal stearate, thereby regenerating a significant component of the stabilized halogenated butyl rubber composition.

The stabilized halogenated butyl rubber composition of this invention can be processed in standard rubber equipment such as internal mixers, mills, extruders, calenders, etc. at the normally elevated temperatures of use for such equipment. Said composition is amenable to conventional rubber compounding practice and various fillers and extenders can be incorporated in said composition, e.g., various carbon blacks, clays, silicas, carbonates, oils, resins, waxes, etc.

The stabilized halogenated butyl rubber compositions of this invention may be cured by any of the prior art methods suitable for such halogenated butyl rubbers, e.g., using sulfur, sulfur-containing curing agents (such as sulfenamide derivatives, benzothiazyl disulfide, tetramethylthiuram disulfide, alkyl phenol disulfide, etc.), zinc oxide alone or with various promoters, and mixtures thereof. Curing is usually accomplished at a temperature of from about 140° C. to about 250° C., preferably 150° C. to about 200° C., and usually takes from 1 to 150 minutes.

The test methods employed in the examples are described as follows:

Color — The colors of thermally exposed rubber samples were rated by comparison with Munsell Color Charts. Lightness was rated from 0–10 by comparing with the Munsell Neutral Value Scale, where 10 is best (white) and 0 worst (black); yellowness was rated from 0–14 by comparing with Munsell glossy color chips of hue 10 YR (yellow) where 0 is best (no yellow).

Stearic Acid — A film of the rubber was prepared by placing approximately 0.5 grams of rubber between nonadhering sheets of plastic film and pressing the composite in a laboratory press at approximately 20 tons platen pressure for approximately 2 minutes at approximately 100° C. The rubber film which is formed is removed from between the plastic, allowed to come to room temperature and mounted in an infrared test unit. Stearic acid is quantitatively determined from the scan which is obtained.

Brabender Plastograph Stability Test — This procedure allows for controlled thermal exposure of polymer samples which can then be analyzed further to rate their performance. A 50 cc chamber was filled with the rubber sample while the blades were rotating at 80 rpm. In this way the required temperature (dictated by the selected oil bath temperature) was reached in about 30 seconds. Following this addition period rotor speed was reduced to 30 rpm and temperature in the polymer mass remained constant. In the examples reported herein a temperature of 180° C. was selected as the test temperature.

This invention will be further understood by reference to the following examples which include but are nonlimiting preferred embodiments of the instant invention.

EXAMPLE 1

In order to demonstrate the further enhancement of polymer stability achieved by the incorporation of a metal oxide or hydroxide in combination with a carboxylate and ether, four batches of halogenated butyl rubber (isobutylene-isoprene type) were prepared using bromine chloride as the halogenating agent. The batches each contained both bromine and chlorine in the halogenated polymer structure and were initially prepared with 1.75 phr (parts per hundred of rubber) calcium stearate and 0.45 phr of a polyether, polyoxyethylene (40) sorbitol septaoleate sold under the trademark Arlatone T and previously described. Each of the batches then had 0.3 phr $Ca(OH)_2$ added by means of a cold rubber mill. Samples of each of the batches were heated in a laboratory press for 10 minutes at 177° C. together with control samples of the same batches containing no $Ca(OH)_2$. The results are tabulated in Table 1.

TABLE 1

EFFECTIVENESS OF $Ca(OH)_2$ IN STABILIZED BROMO-CHLORINATED BUTYL RUBBER COMPOSITION[a]

| Sample | Halogen[b] Br | Cl | Lightness With $Ca(OH)_2$ | No $Ca(OH)_2$ | Yellowness With $Ca(OH)_2$ | No $Ca(OH)_2$ |
|---|---|---|---|---|---|---|
| 1 | 1.96 | 0.17 | 6.0 | 5.5 | 4 | 6 |
| 2 | 1.57 | 0.22 | 7.5 | 6.5 | 4 | 5 |
| 3 | 1.68 | 0.18 | 8.0 | 7.5 | 2 | 5 |

TABLE 1-continued
EFFECTIVENESS OF Ca(OH)$_2$ IN STABILIZED BROMO-CHLORINATED BUTYL RUBBER COMPOSITION[a]

| | Halogen[b] | | Lightness | | Yellowness | |
|---|---|---|---|---|---|---|
| Sample | Br | Cl | With Ca(OH)$_2$ | No Ca(OH)$_2$ | With Ca(OH)$_2$ | No Ca(OH)$_2$ |
| 4 | 1.92 | 0.15 | 7.75 | 6.5 | 3 | 6 |

[a]Butyl rubber was isobutylene-isoprene type with a molecular weight of 400,000-600,000 and unsaturation of 1.5-2.5 mole percent; both properties prior to halogenation.
[b]Halogen content in weight percent.

These data show that the inclusion of Ca(OH)$_2$ in the stabilized composition results in more heat-stable products, since the samples are lighter and substantially less yellow than the controls.

As described earlier, improved stability is also indicated by the reduced level of stearic acid present in the rubber after heat exposure. Reduced stearic acid concentration in the compositions of the present invention are shown in Table 2; samples and conditions were the same as in Table 1, above.

TABLE 2

| | Stearic Acid (phr) | |
|---|---|---|
| Sample | With Ca(OH)$_2$ | No Ca(OH)$_2$ |
| 1 | 0.1 | 1.2 |
| 2 | 0.2 | 1.1 |
| 3 | 0.0 | 0.6 |
| 4 | 0.0 | 0.9 |

EXAMPLE 2

Two butyl rubber samples (isobutylene-isoprene copolymers) were halogenated with bromine chloride to yield polymers containing both bromine and chlorine as shown in Table 3.

TABLE 3

| Sample[a] | Br, Wt. % | Cl, Wt. % |
|---|---|---|
| 5 | 2.15 | 0.18 |
| 6 | 1.90 | 0.22 |

[a]Halogenated isobutylene-isoprene copolymers, properties prior to halogenation; viscosity average molecular weights 535,000 and 522,000 respectively; unsaturation 1.81 and 2.19 mole percent, respectively.

To each of these samples 1.75 phr calcium stearate was added as well as a polyether, polyoxyethylene (40) sorbitol septaoleate, sold under the trademark Arlatone T and previously described, and Ca(OH)$_2$ in varying amounts as shown in Table 4. Color stability was measured as in Example 1, but in this example performance was measured after heating for 20 minutes as well as for 10 minutes at 177° C. The results are summarized in Table 4.

TABLE 4
POLYMER STABILITY AT VARIOUS STABILIZER COMPONENT LEVELS

| | Arlatone T, | Ca(OH)$_2$, | 10 Min-177° C. | | 20 Min-177° C. | |
|---|---|---|---|---|---|---|
| Sample 5 | phr | phr | Lightness | Yellowness | Lightness | Yellowness |
| A | .36 | 0 | 5.5 | 5 | — | — |
| B | .36 | .08 | 5.75 | 5 | — | — |
| C | .36 | .16 | 6.25 | 5 | — | — |
| D | .36 | .24 | 7.0 | 6 | — | — |
| E | .24 | .24 | 7.0 | 6 | — | — |
| Sample 6 | | | | | | |
| A | .36 | 0 | 8.0 | 3 | 5.75 | 5 |
| B | .36 | .08 | 8.0 | 2 | 7.75 | 3 |
| C | .36 | .16 | 7.75 | 4 | 7.0 | 4 |
| D | .36 | .25 | 8.0 | 4 | 7.5 | 4 |
| E | .24 | .25 | 8.0 | 3 | 7.75 | 3 |

It is apparent from the lightness values (after heating 10 min. at 177° C.) in sample 5 that addition of Ca(OH)$_2$, especially at 0.16 phr and above, causes definite improvement in lightness. In the presence of 0.24 phr Ca(OH)$_2$ color stability is not significantly affected by a variation of Arlatone T in the range of 0.24 to 0.36 phr Overall, sample 6 was more stable than Sample 5, and had excellent color stability after 10 minutes of heating at 177° C. However, the significant effect of Ca(OH)$_2$ in combination with the carboxylate and ether became evident after the samples were heated for 20 minutes at 177° C., when as little as 0.08 phr Ca(OH)$_2$ caused a substantial increase in lightness and decrease in yellowness.

EXAMPLE 3

A sample of butyl rubber isobutylene-isoprene copolymer, 1.95 mole % unsaturation, viscosity average molecular weight 530,000 was brominated, recovered using acetone precipitation and bromine content was thereafter measured at 2 wt. %. A stabilized composition was prepared by adding 1.0 phr calcium stearate, 0.45 phr of the polyether Arlatone T and 0.08 phr MgO (commercial form sold under the trademark Maglite K). A stability test was conducted using as a control the same composition without MgO. Color retention and stearic acid content were measured in samples which has been masticated in a Brabender Plastograph at 180° C. for the time periods shown in Table 5.

TABLE 5
STABILITY OF BROMINATED BUTYL RUBBER SAMPLE

| Heating Period | Lightness | | Yellowness | | Stearic Acid[a] | |
|---|---|---|---|---|---|---|
| | No MgO | With MgO | No MgO | With MgO | No MgO | With MgO |
| 4 minutes | 8 | 8 | 4 | 4 | 0.36 | 0.13 |
| 10 " | 5 | 7 | 6 | 4 | 1.03 | 0.38 |

[a]level in phr

When characterized by stearic acid formation it is clear that the stabilized halogenated butyl rubber composition containing all three components is significantly better even at 4 minutes. In samples heated to 10 minutes both color stability and reduced stearic acid content demonstrate the improved performance of this composition.

EXAMPLE 4

A sample of butyl rubber (isobutylene-isoprene copolymer of Example 3) was brominated, recovered from solution using the steam stripping method well known in the art, and bromine content was thereafter measured at 2.08 wt. %. Calcium stearate and a polyether, previously described as polyoxyethylene sorbitol oleate (sold under the trademark G-1087) were present during the steam stripping and MgO was subsequently added. The stabilized polymer composition contained 1.20 phr calcium stearate, 0.45 phr G-1087 and 0.12 phr MgO. A Brabender Plastograph stability test was conducted as in Example 3 using as a control the polymer composition just described but without MgO. The results are shown in Table 6.

TABLE 6

STABILITY OF A BROMINATED BUTYL RUBBER SAMPLE

| Heating Period | Lightness | | Yellowness | | Stearic Acid | |
|---|---|---|---|---|---|---|
| | No MgO | With MgO | No MgO | With MgO | No MgO | With MgO |
| 4 Mins. | 7 | 8 | 2 | 1 | 1.03 | Nil |
| 10 Mins. | 7 | 8 | 6 | 1 | 1.70 | Nil |

The superior stability of the halogenated butyl rubber composition containing all three components, carboxylate, ether and, in this example, metal oxide is again demonstrated.

What is claimed is:

1. A stabilized halogenated butyl rubber composition comprising a copolymer of 85 to 99.5 weight percent of a $C_4$ to $C_8$ isoolefin with 15 to 0.5 weight percent of a $C_4$ to $C_{14}$ multiolefin containing at least about 0.5 weight percent combined halogen in its structure and an effective amount of stabilizer, said stabilizer comprising
   (a) an alkali metal carboxylate or an alkaline earth metal carboxylate,
   (b) an ether, and
   (c) an oxide or hydroxide of a metal selected from Group IIA of the Periodic Table.

2. The composition of claim 1 wherein said halogenated butyl rubber is brominated butyl rubber.

3. The composition of claim 1 wherein said halogenated butyl rubber is chlorinated butyl rubber.

4. The composition of claim 1 wherein said halogenated butyl rubber is bromochlorinated butyl rubber.

5. The composition of claim 2 wherein said copolymer is isobutylene-isoprene.

6. The composition of claim 3 wherein said copolymer is isobutylene-isoprene.

7. The composition of claim 4 wherein said copolymer is isobutylene-isoprene.

8. The composition of claim 1 wherein said ether is a polyether.

9. The composition of claim 8 wherein said polyether is selected from the group consisting of polyalkylene glycols, polyoxyethylene sorbitol esters, polyoxyethylene sorbitan fatty acid esters, polyoxyethylene fatty acid esters, and epoxidized glycerides of unsaturated fatty acids.

10. The composition of claim 8 wherein said polyether is selected from the group consisting of polyoxyethylene sorbitol oleates, polyoxyethylene stearate having from about 4 to about 100 ethylene oxide units per mole of stearate, polyoxyethylene sorbitan monostearate having from about 4 to about 40 ethylene oxide units per mole of sorbitan monostearate, polyoxyethylene sorbitan tristearate having from about 4 to about 40 ethylene oxide units per mole of sorbitan tristearate and polyoxyethylene sorbitan monooleate having from about 4 to about 40 ethylene oxide units per mole of sorbitan monooleate.

11. The composition of claim 8 wherein said polyether is selected from the group consisting of epoxidized soybean oil and epoxidized linseed oil.

12. The composition of claim 1 wherein said metal oxide or hydroxide is selected from the group consisting of $Ca(OH)_2$, CaO, $Mg(OH)_2$ and MgO.

13. The composition of claim 12 wherein said metal hydroxide is $Ca(OH)_2$.

14. The composition of claim 12 wherein said metal oxide is MgO.

15. The composition of claim 1 wherein said carboxylate is selected from the group consisting of sodium, magnesium and calcium carboxylate.

16. The composition of claim 1 wherein said carboxylate is a $C_4$ to $C_{20}$ monocarboxylate.

17. The composition of claim 1 wherein said carboxylate is calcium stearate.

18. The composition of claim 1 wherein said carboxylate is present in an amount of from about 0.1 weight percent to about 10.0 weight percent, and said ether and said metal oxide or hydroxide are each present in an amount of from about 0.005 weight percent to about 5.0 weight percent based on the weight of halogenated butyl.

19. The composition of claim 1 wherein said carboxylate is present in an amount of from about 0.5 weight percent to about 5.0 weight percent and said ether and said metal oxide or hydroxide are each present in an amount of from about 0.01 weight percent to about 3.0 weight percent based on the weight of halogenated butyl.

20. The composition of claim 7 wherein said bromochlorinated butyl contains combined halogen of from about 1.0 to about 3.0 weight percent bromine and from about 0.05 to about 0.5 weight percent chlorine based on the weight of halogenated butyl and wherein said stabilizer comprises calcium stearate present in an amount of from about 0.5 weight percent to about 5.0 weight percent, and $Ca(OH)_2$ and a polyether selected from the group consisting of polyoxyethylene sorbitol oleates are each present in an amount of from about 0.01 weight percent to about 3.0 weight percent based on the weight of halogenated butyl.

21. The composition of claim 5 wherein said brominated butyl contains combined bromine of from about 1.0 to about 3.0 weight percent and wherein said stabilizer comprises calcium stearate present in an amount of from about 0.5 weight percent to about 5.0 weight percent, and MgO and a polyether selected from the group consisting of polyoxyethylene sorbitol oleates are each present in an amount of from about 0.01 weight percent to about 3.0 weight percent based on the weight of halogenated butyl.

* * * * *